(12) United States Patent
Brown

(10) Patent No.: US 8,736,948 B2
(45) Date of Patent: May 27, 2014

(54) ELECTROMECHANICAL BILLBOARD

(71) Applicant: Kedrick F. Brown, Houston, TX (US)

(72) Inventor: Kedrick F. Brown, Houston, TX (US)

( * ) Notice: Subject to any disclaimer, the term of this patent is extended or adjusted under 35 U.S.C. 154(b) by 0 days.

(21) Appl. No.: 13/781,810

(22) Filed: Mar. 1, 2013

(65) Prior Publication Data
US 2013/0176610 A1 Jul. 11, 2013

(51) Int. Cl.
G02B 26/00 (2006.01)

(52) U.S. Cl.
USPC .......................................... 359/290; 345/108

(58) Field of Classification Search
USPC ................. 359/290; 345/108; 40/606.14, 624
See application file for complete search history.

(56) References Cited

U.S. PATENT DOCUMENTS

| 4,769,638 | A |   | 9/1988  | Woolfolk            |
|-----------|---|---|---------|---------------------|
| 5,430,463 | A | * | 7/1995  | Fontalirant ...... 345/108 |
| 6,396,205 | B1 |  | 5/2002  | Sprague             |
| 6,985,132 | B2 |  | 1/2006  | Nomura et al.       |
| 8,064,112 | B1 |  | 11/2011 | Bernasconi          |
| 8,154,509 | B2 |  | 4/2012  | Karaki              |
| 8,154,789 | B2 |  | 4/2012  | Cha et al.          |
| 8,310,747 | B2 |  | 11/2012 | Lee et al.          |

* cited by examiner

Primary Examiner — Joseph P Martinez
(74) Attorney, Agent, or Firm — Louis Ventre, Jr.

(57) ABSTRACT

An electromechanical image display includes a box-structure of cups arranged in a row and column matrix. A non-rotatable axle for each column in the matrix passes through each of the cups in a column. The axle holds display elements which are rotatable on the axle. At least one electric-field-generating conducting plate in each cup is connected to an electrical source. A display element for each cup is a parallelepiped having six faces with a tunnel through the geometric centers of two of the six faces to permit its installation on the axle. The display element is an electret, or contains one or more electrets, that rotationally responds to the electric field of the electric-field-generating conducting plate.

8 Claims, 5 Drawing Sheets

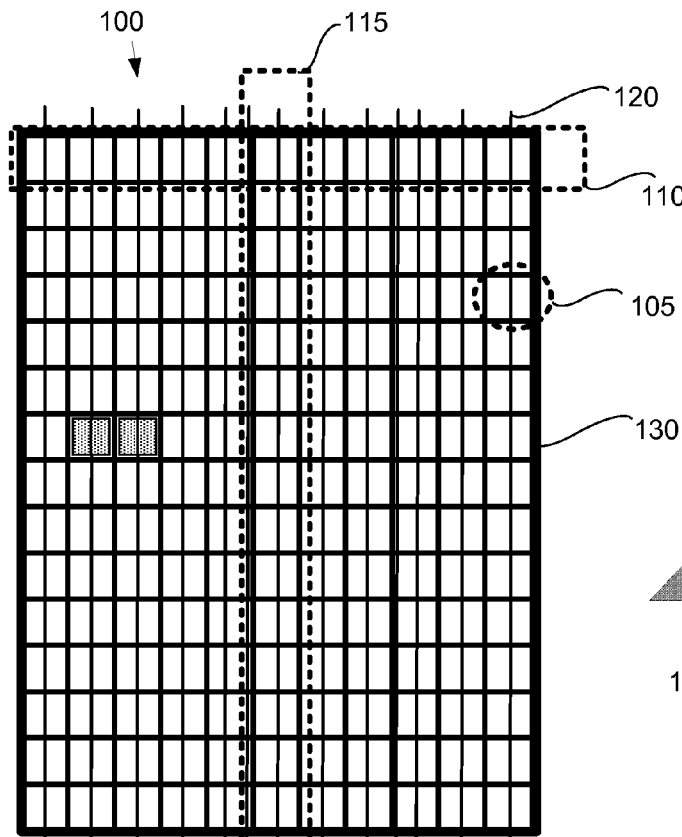
FIG.1
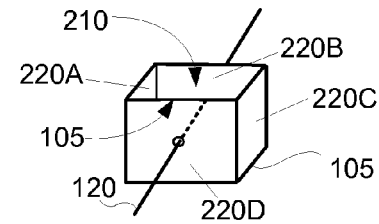
FIG.2
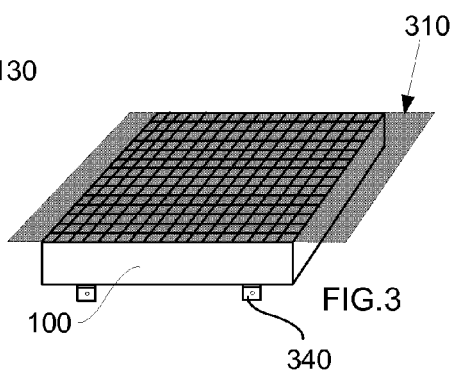
FIG.3
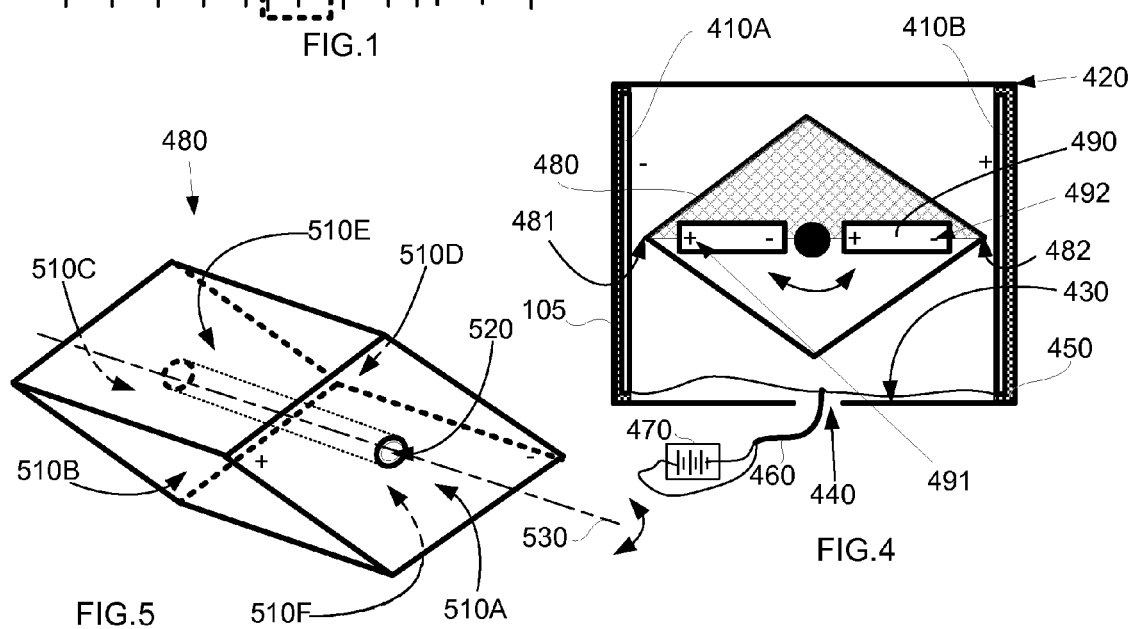
FIG.4
FIG.5

ELECTROMECHANICAL BILLBOARD

TECHNICAL FIELD

In the field of optical systems and elements, an electromechanical device is described that employs light deflection using rotatable elements to produce a changeable billboard.

BACKGROUND ART

Modern electronic-paper designs commonly utilize colored microcapsules (typically either black or white) that migrate through a medium contained within the display when under the influence of electric fields. For example, the E-INK CORPORATION monochrome active matrix utilizes a plurality of both black and white microcapsules suspended in clear fluid within a number of hollow, spheroidal cells having transparent membranes. Thus, both the membranes of the spheroidal cells and an additional transparent electrode intervene in the space between the microcapsules and the viewer. For these and other reasons, the color white in such electronic paper displays does not look exactly like the white color of a regular sheet of paper but is instead noticeably grayer. The contrast of such electronic paper displays are also generally lower than experienced with paper.

In such existing art, microcapsules may collide with each other within the display or collide with the internal surface of the cells housing them, causing wear on the display apparatus. Image ghosting may also occur from time to time.

Another set of electronic paper displays pioneered by XEROX uses bicolor spherical electret balls (i.e. the "GYRICON" technology) suspended in a medium. This design does not use an axle as in the present invention. The GYRICON balls migrate through the medium similarly to other microcapsule based display technologies and may also collide with each other or the internal surface of their container.

Large-scale information display panels have been described that are made up of basic picture elements for application to advertising, transportation information, traffic control, news, weather, financial data and other information normally generated by computers. Such systems as described in U.S. Pat. No. 4,769,638 utilize either two intersecting planes rotational about an axis at the intersection of the planes, or 3 intersecting plane surfaces contained within two transparent holding spheres. A bar magnet acts as an armature for rotation of the element with current flow through a coil and a holding force with magnetic circuit material resists shifting from a set orientation in a two coil driven configuration. The L-shaped brackets in this type of display can lead to the loss of display elements should the display be tilted to its side or turned face down. Also, the intersecting planes, which are the display elements, allow unwanted colors and shadows to show up on each display element depending on the vertical angle of the viewer with respect to the display. This type of display has numerous components, such as a separately operable axle on each display element, and is difficult to manufacture, assemble and maintain. Materials capable of producing a magnetic shielding effect by redirecting magnetic field lines can also be saturated, and may be relatively expensive as in the case of mu-metal.

SUMMARY OF INVENTION

The display is an electromechanical image display. The display first includes a box-structure of cups, like an ice cube tray, arranged in a row and column matrix. Each cup is made of an electrically conducting material and has an open-end facing outward. The open-end is defined by an edge of the cup, which cup edges in aggregate lie in a virtual plane of a viewable surface. Each cup has a bottom wall opposite the open-end. The bottom wall has one or more holes in it to permit passage of electrical wires out of the cup. The cup preferably has four sidewalls, but conceptually may have one seamless wall.

The display includes an axle for each column in the matrix. The axle pierces each of the cups in a column such that when the viewable surface is vertical, the axles are also vertical and fixed so that they do not turn. The axle holds display elements partially or wholly within each cup in its column and these display elements turn on the fixed axle.

The display includes one or two or three electrically-chargeable electric-field-generating conducting plates in each cup: two when adjacent to opposing side walls, one when adjacent to the bottom wall, and three when these are combined.

The display includes electrical insulation in each cup that electrically isolates the electric-field-generating conducting plate or plates from the cup's sidewalls.

The display includes one or more insulated wires for each electric-field-generating conducting plate. The insulated wire is connected between the electric-field-generating conducting plate and an electrical source used for charging the electric-field-generating conducting plate. The insulated wire passes through the hole in the bottom wall of the cup.

The display element for each cup is a parallelepiped having six faces. This is similar to a cuboid structure except that the faces do not necessarily join at right angles. Other shapes are also possible for example with smoother contours on the vertically running surfaces. Each display element has a tunnel through the centers of two of the six faces to permit its installation on the axle. Thus, the tunnel serves an axis of rotation for the display element;

The display element is an electret, or one or more electrets are included within the display element. An electret has a quasi-permanent electric charge or dipole polarization so that it can be manipulated to turn around the axle when acted upon by the electric field produced by one or more electric-field-generating conducting plates. The electret causes rotation of the display element to a fixed position such that alternate pairs of faces of the display element face outward at the open end. These paired faces do not have a tunnel through them. Typically, two faces without an opening for the tunnel are colored one color and the remaining two faces without a tunnel are white. Each electret has a positively charged polarity that faces a first junction of two faces of the six faces of one display element. A negatively charged polarity faces an opposing second junction of the remaining two faces of the six faces that do not have a tunnel through them.

Technical Problem

Digital paper, while in principle being suitable for billboard displays, is largely not preferred for billboard displays because of poor contrast at a distance, a limited number of color digital paper alternatives and high parts complexity compared to LED driven billboards. Display elements are often embedded under transparent material or encapsulated within transparent material, shielding them from being directly viewed by the viewer. The cavities for the display elements are typically also permeated by an optically transparent dielectric fluid to inhibit stray movement, which also affects viewability.

Existing systems can experience wasted electric field energy if electrodes in close proximity that are intended to act on different display element regions are not shielded from each other. Electrical shielding in the present invention is provided by using a tray made of conducting material, which provides a measure of electrical isolation of the display elements and their driving electric fields from one another.

Rotation of bi-color display elements in existing designs (e.g., the GYRICON technology) permit unintended sideway rotation of a display element, which can adversely affect the performance and viewability of the display.

Existing large-scale billboard devices present an intersecting plane shape to the viewer, which effectively means that unwanted colors and shadows can show up on each 4-color display element depending on the vertical angle of the viewer with respect to the display.

Existing or proposed electronic color paper displays display color by using microcapsules with different inertial properties that react differently to electric fields, increasing the complexity of these devices compared to simpler monochrome devices. Yet other electronic paper technologies display color using advanced technologies like electro-wetting and interferometric modulators. A deficiency common to consumer electronics-scale technologies is that they have varying but very high degrees of complexity and usually include transparent layers that intervene between display elements and the viewer.

Finally, flip-board technologies of the sort often seen at airports or train stations have high mechanical complexity and are often confined to displaying a limited number of predefined letters or symbols.

Most electronic paper manufacturers to date have focused on consumer-electronics scale devices, an area where there is already intense competition from smartphones and tablets having higher color gamut and faster image refresh rates. As a result, the development of novel electronic paper display technologies for billboards or other large scale surfaces has been relatively slow.

An average viewer would expect significantly lower performance from a large-scale electronic paper display than from a handheld electronic display. Firstly, the image refresh rate of large-scale printed or painted displays such as billboards, road signs, wall murals, theater stage backdrops etc. is of little importance to an average viewer. Secondly, few large-scale displays are interactive or display content directly requested by average viewers.

Yet even given these reduced constraints, practical technologies capable of flexible image display on billboards are limited. Billboard technologies capable of flexible image display are either largely confined to LCD/LED displays that emit light (often with accompanying glare) while continuously consuming energy, reflective displays in which a very limited number of predetermined pictures can be shown by rearranging panels of the display that face the viewer at periodic intervals, or flipboard-type displays of the kind seen at airports or train stations, which are bulky and generally limited to text or symbols.

Solution To Problem

The solution is the present invention that enables the display of large scale monochrome or color images on electronic paper by using a plurality of rotatable bicolor electret display elements mounted on axles running through the electrically shielding partition walls of adjacent cell spaces, such that each display element is recessed within its respective cell space. When in position within a billboard, the axles are vertically oriented so that the force of gravity brings each display element to rest against the frictional surface of a partition wall when its driving electric field is off, reducing angular drift of display elements. When used as a large display laying flat on a desk, floor or against a ceiling, the axles run horizontally or vertically, and additional means such as a frictional axle surface are employed to minimize unintended angular drift of display elements.

The torque transmission apparatus is an electric-field-generating-conducting plate, also descriptively referred to as an electric-field-generating-conducting plate, within each display element cell space. The electric-field-generating-conducting plate is insulated from the surface of the cell space. The electric-field-generating-conducting plate remains hidden from the viewer at the very back of the "ice-cube cup," eliminating the need for an intervening surface between the display element and the viewer (other than to protect against the elements). To strengthen the electric field brought to bear on the display elements when an image meant for long periods of static viewing is intended to be changed, a framed array of electric-field-generating conducting plates may be brought parallel to the surface of the display for use in conjunction with the array of electric-field-generating-conducting plates present in the cells, that is the cups.

Advantageous Effects of Invention

The present invention uses neither transparent display element casings, nor fluid. Rather to simplify the apparatus, gravity and friction are used to keep display elements from drifting from their angular orientations with respect to a viewer in a vertically oriented display when the driving electric fields are off. Other optional means may be used to inhibit stray motion of display elements on their axles (e.g. axles with frictional surfaces) if axles are horizontal.

To improve viewability, the present invention preferably employs one or two eared brackets to hold the display elements in an elevated position above the plane of the tray partition walls. In this way, the leading edge of a display element is extended above the surface of the display, which improves the contrast and alters the degree of electrical shielding of the display elements by the partition walls.

The present invention uses a single axle for an entire column of display elements, which fixes each display element's axis of rotation and retains it in place when the display is oriented vertically and even upside down. This structural feature also eliminates color blurring when the display element's electret poles are aligned with its driving electric field. An axle is not present in any prior art with microscopic display elements.

The present invention uses a parallelepiped display element that shows two faces to the user over a very broad range of viewing angles.

With the present invention, each bicolor display element is unique in that it may be colored both white and an ink color that enables it to display a portion of a separated single-color/white image associated with an established ink printing process requiring multiple inks.

A primary advantage of the present invention is that it provides a novel technology for a large-scale, color electronic-paper display that exhibits high contrast under ambient light, and is able to display a very wide variety of images without replacing any elements of the display.

The proposed technology is also simple, stable and versatile because firstly, mounting bicolor display elements on axles is significantly simpler than arranging display elements in any of the other electronic paper technologies described above. Display elements orders of magnitude larger than typical electronic paper microcapsules should also lead to lower complexity in display construction as well as good color contrast.

Secondly, mounting display elements on axles prevents their collisions with unintended portions of the support structure.

Finally, using axles to hold display elements in place means that contoured axles can be used to create contoured electronic paper surfaces. Contoured electronic paper billboard displays provide additional dimensions of flexibility for advertisers, theater stage prop manufacturers, etc.

BRIEF DESCRIPTION OF DRAWINGS

The drawings illustrate preferred embodiments of the invention and the reference numbers in the drawings are used consistently throughout. New reference numbers in FIG. 2 are given the 200 series numbers. Similarly, new reference numbers in each succeeding drawing are given a corresponding series number beginning with the figure number. The views below are described based on a billboard, also referred to herein as a display, oriented in a horizontal position rather than a vertical position for an installed display.

FIG. 1 is a plan view of the box-structure of the display showing a matrix of cups.

FIG. 2 is a perspective of a cup.

FIG. 3 is a perspective of the box-structure showing a virtual plane of the viewable surface on the box-structure.

FIG. 4 is a side view of a cup holding a display element.

FIG. 5 is a perspective of the display element.

DESCRIPTION OF EMBODIMENTS

Figure 6:
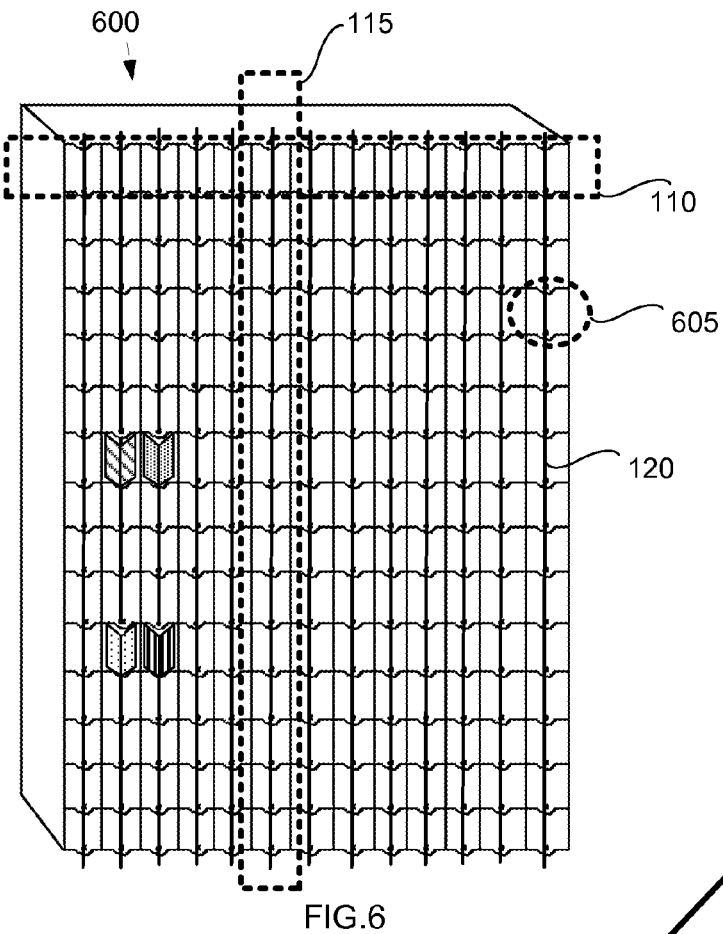
FIG. 6 is a perspective of an alternative embodiment of the box-structure using an ear on the cups to elevate the axle above the virtual plane.
Figure 7:
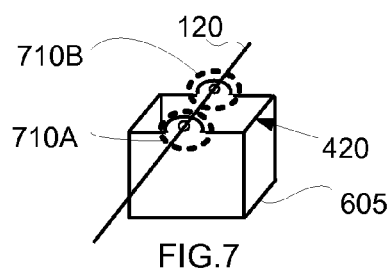
FIG. 7 is a perspective of a cup with ears to elevate the axle above the virtual plane.

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

In short, the claimed apparatus is an electromechanical image display that includes a box-structure (100); an axle (120); a cup (105) replicated in a row and column matrix; an axle (120) for each column of cups; one or more electric-field-generating conducting plates, such as a first electric-field-generating conducting plate (410A), a second electric-field-generating conducting plate (410B); and a bottom electric-field-generating conducting plate (910); insulation (450); an insulated wire (460); a display element (480); and when the display element (480) is not itself an electret, an electret (490). There may be more than one electret, as shown in FIG. 4.

FIG. 1 is a plan view of the box-structure (100) of the display showing a matrix of cups. The box-structure (100) essentially defines a plurality of cups arranged in a row (110) and column (115) matrix, much like an ice-cube tray. The box-structure may have a perimeter frame (130) that enables connection to an adjacent perimeter frame in order to enable modular assembly of a large billboard display. The perimeter frame (130) preferably has extensions (340) on back of the display. These extensions (340) are ell-brackets extending backwards behind the display so as to permit a support rod to be added behind the display for mounting or to enable connection to an adjacent frame.

The ice-cube tray analogy enables one to picture a grid of electrically conducting material, composed of a plurality of cup-like "cell spaces" each separated from each other by partition walls, and which may be colored white in order to mimic the color of paper. The cup-like cell spaces should be envisioned as arranged with the plane of the tray being vertical so that the cell spaces within the tray can be viewed by a viewer looking at the tray along a horizontal line of sight.

Each cup (105) in the plurality of cups is made of an electrically conducting material, such as aluminum or copper. Each cup (105) has an open-end (210) facing outward, just like in an ice-cube tray. The open-end (210) of the cup is defined by an edge (420) of the cup (105). The edges in the plurality of cups define a virtual plane (310) of a viewable surface.

Figure 8:
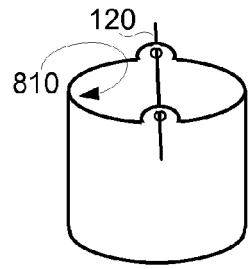
FIG. 8 is a perspective of an alternative cup with an ear and a seamless wall.

Each cup (105) has a bottom wall (430) opposite the open-end (210), the bottom wall (430) having a hole (440) through it to permit exit of the electrical wires from one or more electric-field-generating conducting plates. Each cup (105) also has one or more side walls. Preferably, there are four sidewalls: first sidewall (220A); second sidewall (220B); third sidewall (220C); and fourth sidewall (220D). FIG. 8 illustrates a cup with one side wall, which is a side wall (810) that is seamless.

Whether there is a single side wall or multiple side walls, the cup may include one or more ears, for example first ear (710A) and second ear (710B), on the side wall (810) of each cup (105) extending above the edge (420) of each cup (105). When two ears are used, they are preferably located 180 degrees apart. Each ear (710A) is aligned on each cup (105) to hold the axle (120) above and parallel to the virtual plane (310). Thus, the axle (120) for each column (115) passes through an ear of each cup (105) in said column (115), or when two ears are used, it preferably passes through first ear (710A) and second ear (710B). The axle (120) in turn holds two faces of the display element (480) above the virtual plane (310) to provide enhanced contrast on the displayed image. Different elevations of the axle above the plane vary the degree of electrical shielding of the display elements by the partition walls. For a roundish cup as shown in FIG. 8, the display element (480) would preferably have rounded edges so as to better fit within the cup.

There is an axle (120) for each column (115) in the matrix. The axle (120) is fixed in place and does not turn or otherwise rotate. The axle (120) for each column (115) is non-rotatably attached and passes through two of the four sidewalls of each cup (105) in one column (115). These are shown in FIG. 2 as second sidewall (220B) and fourth sidewall (220D).

The axles may be envisioned as being inserted through multiple parallel holes running vertically through the horizontally oriented partition walls of the tray. These holes may also be made even with the leading edge of the tray closest to the viewer by adding small round C-shaped brackets or ears, first ear (710A) and second ear (710B) that extend horizontally past the edge of the tray's horizontally running partition walls, through which holes, intended to permit passage of the axles vertically, are punched. In alternative embodiments, exotic axle configurations may be used to create contoured or angled display areas. Such axle configurations are useful for example in angled or contoured prop/backdrop designs for stage productions where the image displayed on the prop/backdrop is periodically changed, thus reducing the workload on stagehands. Alternate display element axle arrangements may be used (e.g. horizontal axles).

As shown in FIG. 4, the embodiment with two electric-field-generating conducting plates per cup (105) has the first electric-field-generating conducting plate (410A) on the left side of the cup and the second electric-field-generating conducting plate (410B) opposite that on the right side of the cup in FIG. 4. Thus, these two electric-field-generating conducting plates: first electric-field-generating conducting plate (410A) and second electric-field-generating conducting plate (410B) are preferably located adjacent to two sidewalls of the four sidewalls; these two sidewalls being opposite to each other and not the sidewalls with the axle holes for the tunnel (520). The sidewalls with the axle holes for the tunnel (520) are second sidewall (220B) and fourth sidewall (220D). In an embodiment with a seamless side wall and no ears, the electric-field-generating conducting plates are preferably 180 degrees apart and with their faces generally parallel with the axle (120).

Figure 9:
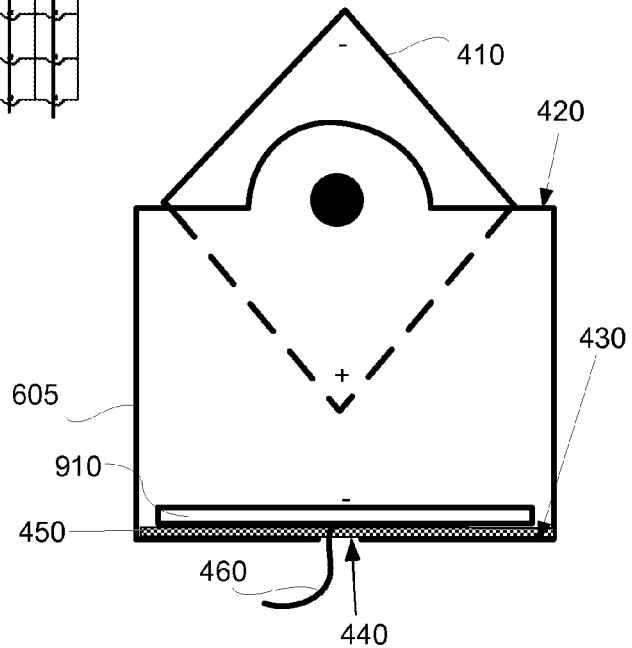
FIG. 9 is a side view of a cup with ears holding a display element that extends above the virtual plane.
Figure 10:
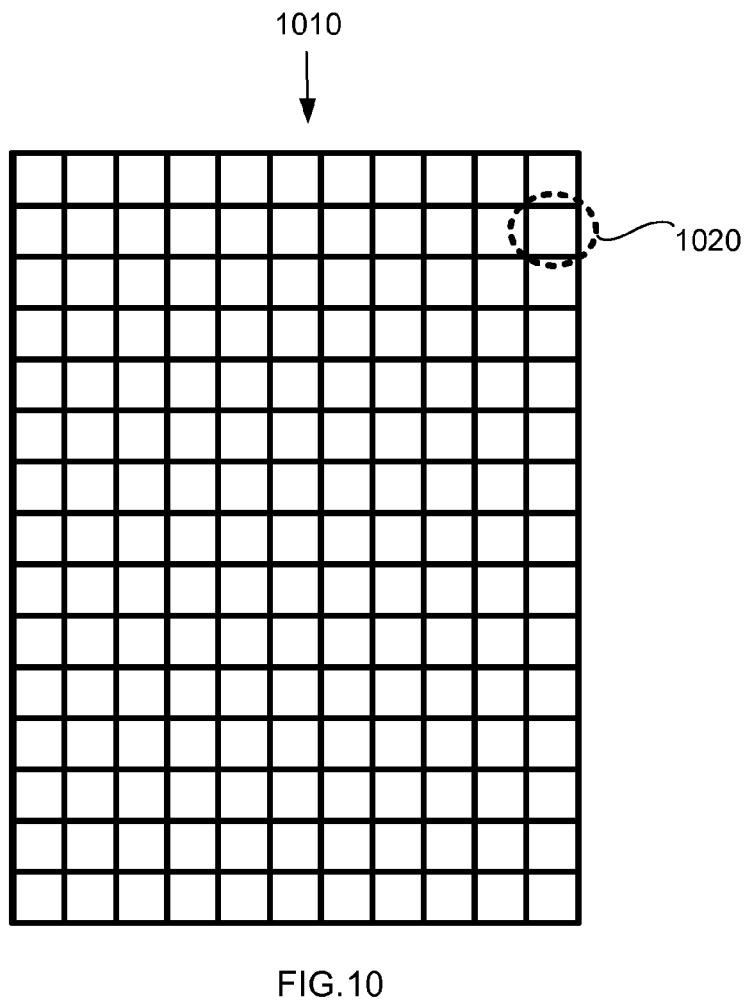
FIG. 10 is top view of a framed array of removable electric-field-generating conducting plates matching the row and column matrix of the box-structure.

In the embodiment shown in FIG. 9, there is one electric-field-generating conducting plate. It is a bottom electric-field-generating conducting plate (910), which is located adjacent to the bottom wall (430) in each cup (105) in the plurality of cups. This embodiment may have a cup with one or more side walls.

Figure 11:
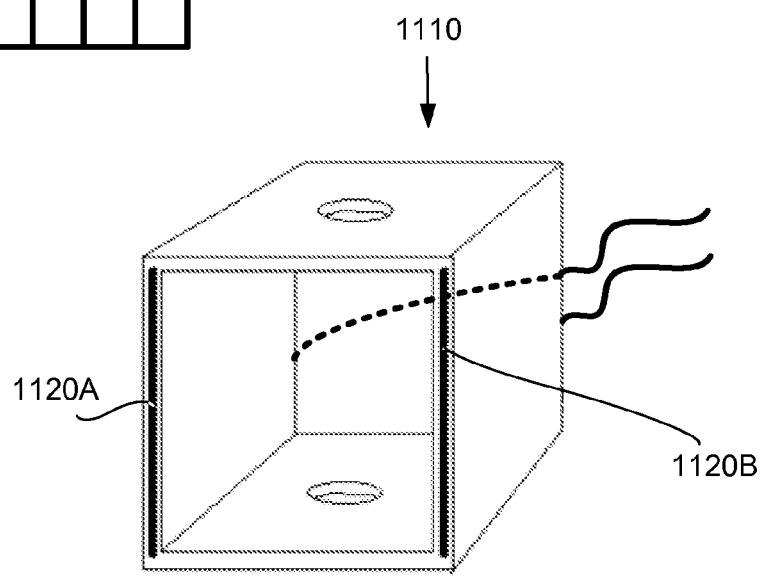
FIG. 11 is a perspective of a second cup insert.
Figure 15:
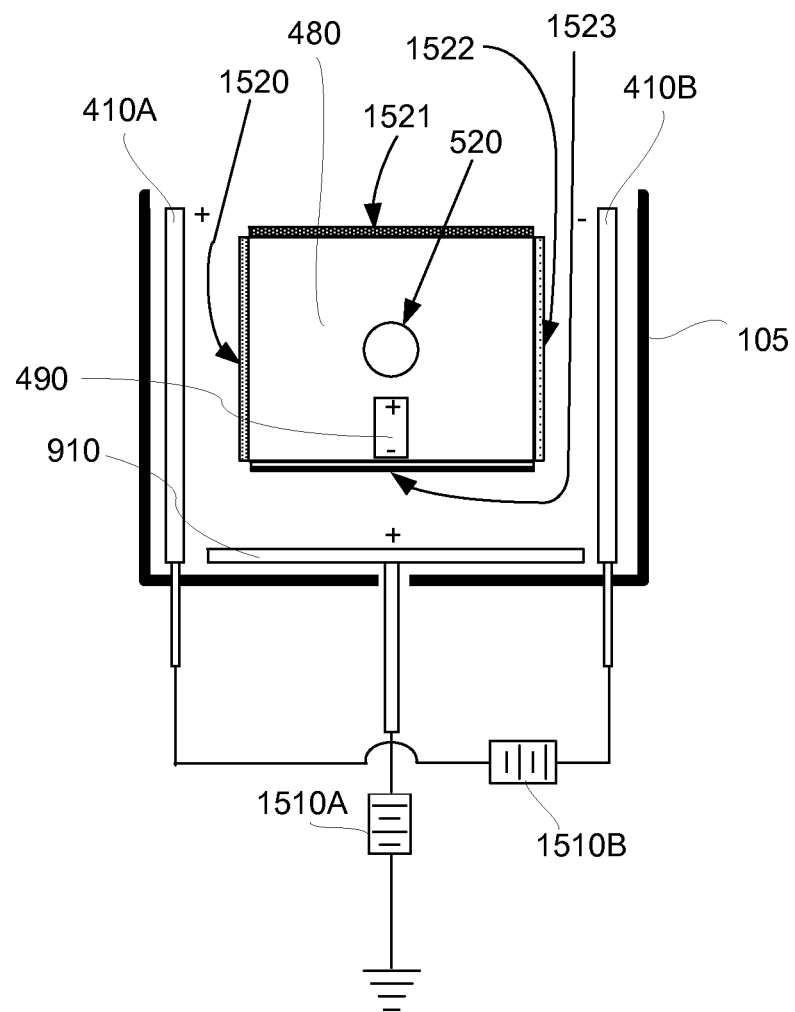
FIG. 15 is a side elevation view of a cup, display element, and 3 removable electric-field-generating conducting plates.

Alternative embodiments include a modular means to secure the electric-field-generating conducting plates in the cup (105). FIG. 11 illustrates a second cup (1110) made of a rigid non-conducting material that fits relatively snugly within the cup (105). The electric-field-generating conducting plates, namely the third electric-field-generating conducting plate (1120A) and the fourth electric-field-generating conducting plate (1120B), are embedded in the second cup's two parallel vertical walls and holes through its two horizontally running walls allow passage of a vertically-oriented axle. Thus, optionally, there is a second cup (1110) for each cup (105) in the plurality of cups. The second cup (1110) is made of a non-conducting material and conforms to and fits within each cup (105) in the plurality of cups. The second cup (1110) preferably holds two electric-field-generating conducting plates embedded within two opposing side walls of the second cup (1110). A fifth electric-field-generating conducting plate may be embedded within the second-cup bottom wall, similar to that as shown in the cup of FIG. 15.

To clarify, the second cup (1110) would contain the only capacitor plates in the cup (105) that it is inserted into, that is, there would not be a third, fourth or fifth electric field generating conducting plate within the cup (105) if an insert (1110) is used—only a first, second or third. The terms third electric-field-generating conducting plate (1120A) and fourth electric-field-generating conducting plate (1120B) are used to distinguish them from the plates in the cup (105).

Other alternative embodiments may utilize mechanisms other than one or more electric-field-generating conducting plates to deliver torque to display elements, such as compressed air streams.

Examples of Cups, Electric-Field-Generating Conducting Plates and Display Elements In this exemplary embodiment, at the bottom of each "ice cube cup" (i.e. adjacent to the farthest vertical plane of the display with respect to a viewer) is placed a flat electric-field-generating conducting plate (covering as much of the bottom surface of the cup as possible) that is insulated from the bottom metal surface of the cup, but also connected to a power supply through an insulated wire extending through a tiny hole in the bottom of the cup, thus enabling the conducting plate to be charged and to generate an electric field that acts on the electret poles of the display elements at close proximity. The conducting nature of the partition walls provides a measure of electrical shielding of the contents of each cell space, enabling the conducting plate when charged to strongly impact on the nearest electret pole of an immediately adjacent display element.

This electric field generated by the conducting plate is then used to rotate an individual display element about its stationary axle relative to a viewer until a desired orientation of the display element is achieved that displays a specific color to the viewer.

In a first exemplary embodiment of the invention, the conducting plate inserted into the bottom of each tray provides the entire electric field necessary for rotating the electret display element within that cell space until it reaches a desired configuration with respect to the viewer. In this embodiment about half of the body of each electret extends past the surface of the tray, and the conducting plate may either provide a continuous electric field, or an electric field that turns on periodically to change the image on the display or correct any angular drift of display elements (e.g. from air currents, stray electric fields or other effects). In this embodiment, axles are vertically oriented so that part of the display element rests against a partition wall due to the force of gravity.

In a second exemplary embodiment of the invention, the conducting plate inserted into the bottom of each tray provides the entire electric field necessary for rotating the electret display element within that cell space until it reaches a desired configuration with respect to the viewer. In this embodiment, each electret's body is fully recessed within the surface of the tray, and the conducting plate may either provide a continuous electric field, or an electric field that turns on periodically to change the image on the display or correct any drift of display elements (e.g. from air currents, stray electric fields or other effects). In this second exemplary embodiment, axles are vertically oriented so that part of the display element rests against a partition wall due to the force of gravity.

In a third exemplary embodiment of the invention, the bottom electric-field-generating conducting plate (910) inserted into the bottom of each cup (605) provides half of the entire electric field necessary for rotating the electret display element within that cup (605), also known as cell space, until it reaches a desired configuration with respect to the viewer. In this embodiment, each electret's body may be either fully or partially recessed within the body of the cup (605). However, the display is not enabled for continuous refresh. Instead, a removable framed array (1010) of sixth electric-field-generating conducting plates (1020) is brought parallel to the surface of the display (blocking the view of the display from the viewer's side) when an image meant for long periods of static viewing is meant to be changed. This framed array is then removed to enable direct viewing of the display. Preferably, each of the sixth electric-field-generating conducting plates (1020) in the array corresponds to one bottom electric-field-generating conducting plate (910) within the display, so that a respective parallel-plate capacitor may act on the display element in each respective cup.

An optional transparent cover to the entire display may be added to protect against elements, but this is not necessary for the functioning of the display.

In other embodiments, an opaque capacitor plate adjacent to the bottom wall 30 may be used in conjunction with a transparent capacitor plate at the viewable surface or front wall. Finally, in other embodiments, no capacitor plate embedded in the display is used when a separate capacitor plate array is used.

The insulation (450) in each cup (105) electrically isolates the electric-field-generating conducting plates from the cup walls. In an embodiment with two electric-field-generating conducting plates, the insulation (450) electrically isolates the first electric-field-generating conducting plate (410A) and second electric-field-generating conducting plate (410B) from the four sidewalls: first sidewall (220A); second sidewall (220B); third sidewall (220C); and fourth sidewall (220D). Similarly, in an embodiment with one electric-field-generating conducting plate, as shown in FIG. 9, the insulation (450) electrically isolates the bottom wall (430) and the four sidewalls from the bottom electric-field-generating conducting plate (910).

The insulated wire (460) for each capacitor plate is connected between the capacitor plate and an electrical source (470). The insulated wire (460) is preferably a two-conductor cable where each conductor is insulated from the other and where one conductor can be connected to a positive terminal and the other conductor can be connected to a negative terminal of an electrical source (470). The insulated wire (460) passes through the hole (440) in the bottom wall (430). In an embodiment with one electric-field-generating conducting plate, to with the bottom electric-field-generating conducting plate (910), which is adjacent to the bottom wall (430), the insulated wire (460) is connected between the bottom electric-field-generating conducting plate (910) and the electrical source (470). The insulated wire (460) passes through the hole (440) in the bottom wall (430). Optionally, in the embodiment with 2 electric-field-generating conducting plates, there are holes on the left and right sides of the bottom wall (430), that is, one hole for each wire.

The display element (480) fits within each cup (105) and is a parallelepiped having six faces: first face (510A); second face (510B); third face (510C); fourth face (510D); fifth face (510E); and sixth face (510F). There is a tunnel (520) through the centers of two of the six faces as shown in FIG. 5: first face (510A) and the third face (510C). The axle (120) fits through the tunnel (520) and the tunnel becomes the axis of rotation (530) for the display element (480). One display element (480) is rotatably placed on the axle (120) within the four sidewalls of each cup (105) in its column (115). Being placed within the four sidewalls means that each display element (480) is preferably fully within each cup such that its leading edge is below the edge (420) of each cup (105). In the embodiment with two ears, first ear (710A) and second ear (710B), one display element (480) is rotatably placed on each axle (120) between the first ear (710A) and second ear (710B) of each cup (105), and consequently is not fully below the edge (420) of each cup (105).

A parallelepiped is a three-dimensional figure formed by six parallelograms as shown in FIG. 5. The term rhomboid is also sometimes used with this meaning. A cuboid is also sometimes used, but this is more limited in that the faces join at 90 degree angles, which is not necessary for the present invention. In terms of preferred embodiments, all that matters from the viewer's perspective is that the display element (480), or alternately a pixel containing a number of display elements, covers an area that looks square, and this enables rectangular vertically running faces depending on the angle that the faces meet at, while each of the faces through which the axle runs are preferably a rhombus.

In this manner, the display elements housed on axles may be either partially or fully recessed within the cell spaces of the display. This permits adjustment of the contrast and alters the desired degree of electrical shielding of the display elements by the partition walls. The axles are passed through the horizontally running partition walls for each column of the display, and on them, within the respective cell spaces, are placed parallelepiped bicolor electrets (the display elements), each with a tunnel punched through the centers of opposing rhomboid faces. The axles are then immobilized by fixing them in some fashion to the body of the tray. Each axle may be prevented from rotating by mooring it at least to the boundaries of the display module (e.g., through welding of the tips of the axle to the tray, etc.), but also attaching it to the sidewalls of a number of cups.

The placement of the display elements on axles that are even with the leading edges of the vertical partition walls enables half of each display element to extend beyond the surface of the tray, enabling the viewer to directly see a high contrast display element whose display surfaces are not recessed within a cell space (thus reducing shadows), and which is not covered by a transparent film or encapsulation materials that may cause glare or lower contrast. Alternately, the placement of the display elements on axles recessed within the horizontal partition walls provides display elements with a greater degree of electrical shielding and a less bumpy display profile from close up while still providing good color contrast.

In preferred embodiments, four of the six faces of each display element are a rectangle satisfying the condition that a horizontally running line splitting the display element in half along the direction of its poles by joining the 2 intersections that define the poles would measure $3/16$ of an inch, while a vertical line running from the top to the bottom of the display element would measure $3/16$ of an inch, as well. There is a $1/128$" thick ring of clearance in the axle tunnel after the axle has passed directly through its center, making the inner diameter of the axle tunnel, including any protective sleeves lining it, to be $1/16$".

The display element (480) in its entirety may be an electret or alternatively an electret (490) is embedded within the display element (480). There may be more than one electret as shown in FIG. 4. The electret (490) is positioned so that a positively charged polarity (491) is facing a first junction (481) of two faces of the six faces and a negatively charged polarity (492) is facing a second junction (482) of the remaining two faces of the six faces not defining a tunnel (520). The end effect of this positioning is that when the electric-field-generating conducting plate or plates in any one cup (105) have an electric charge, the electric field from said electric charge causes the electret (490) within that cup (105) to rotate to a fixed position such that two faces of the parallelepiped are displayed facing outward at the open end.

In embodiments where the electret (490) is embedded within the display element (480), the display element is preferably made of a durable, light, rigid, non-conducting material that can withstand frictional movement across the surface of the cup side-wall on which it rests when the viewing surface, that is virtual plane (310), is in the vertical position.

Figures 12, 13:
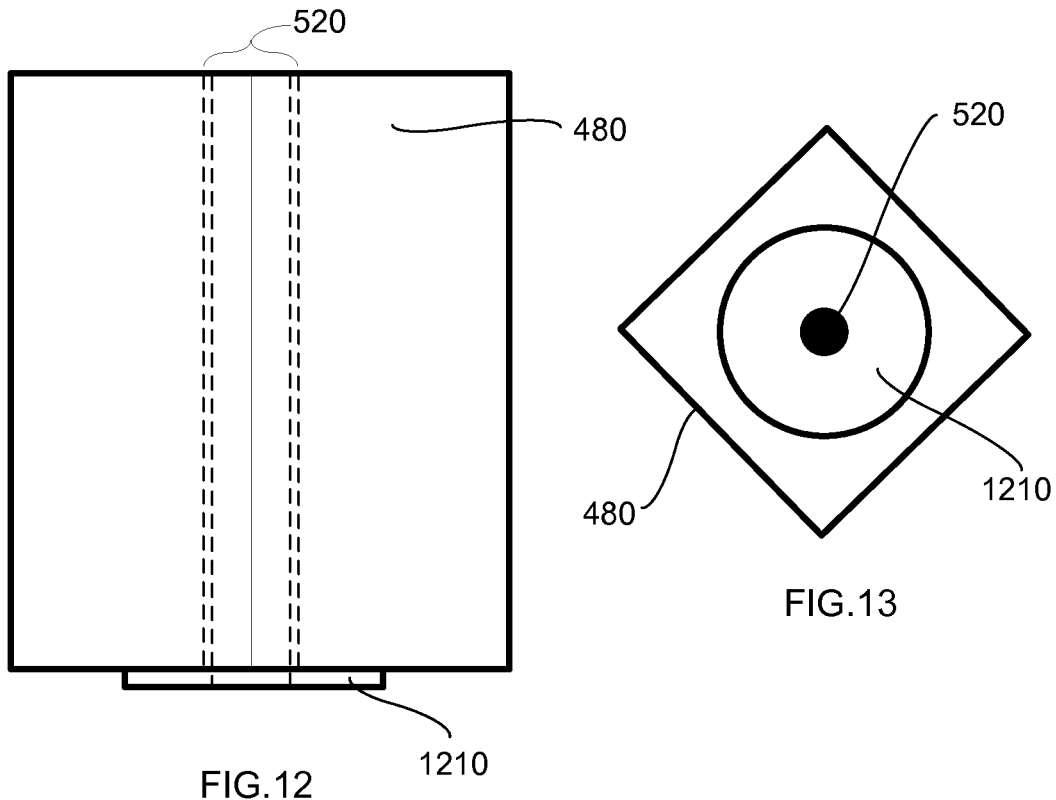
FIG. 12 is a top view of a display element with a protective sleeve.
FIG. 13 is a side elevation view of the protective sleeve shown in FIG. 12.

In other embodiments, principally where the display element (480) in its entirety is an electret, which may reduce its surface hardness, then the tunnel (520) may be lined with an adhering protective sleeve, preferably about 1/128 of an inch thick. FIG. 12 and FIG. 13 illustrate such a protective sleeve (1210). The protective sleeve (1210) is preferably made of durable material, such as plastic, that extends to cover part of the display element's downward pointing face, thus protecting the bottom surface of the display element (480) from frictional movement across the surface of the cup side-wall on which it rests when the box-structure (100) is in the vertical position. The protective sleeve (1210), thus, becomes a sacrificial surface against the cup side-wall.

Figure 14:
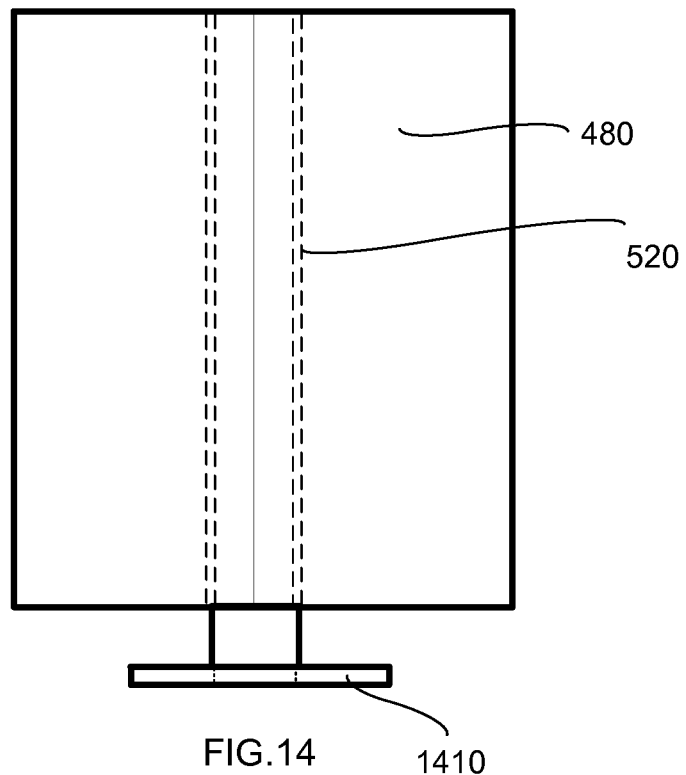
FIG. 14 is a top view of a display element with a cylindrical guide.

Alternatively, an adhering cylindrical guide (1410), as illustrated in FIG. 14, lines the tunnel (520) and may also rest against the surface of the axle (120). This cylindrical guide (1410) may extend past one or both square faces of the display element so that it makes contact with one or both cup side walls. Thus, the cylindrical guide (1410) serves as a spacer between the display element (480) and the cup side wall or walls and also acts through friction to inhibit stray rotation of the display element (480). The cylindrical guide (1410) may be flared so that a flat ring, or edge, sits on the cup face of a display element to further inhibit stray motion of display elements.

Orienting the display elements on vertically running axles means that due to the force of gravity they will rest against the surfaces of the horizontally running partition walls. These walls thus provide a measure of friction that reduces unwanted angular drift of the display elements when a driving electric field is not present. Alternately, if display element axles are made to run horizontally other optional means such as non-smooth axle surfaces and/or tunnel lining material may be employed to reduce unwanted angular drift.

Each display element is preferably half colored white to simulate the color of paper to a viewer (i.e. colored white on 2 of its 4 rectangular faces and half of each of its 2 rhomboid faces) and on the remaining half colored a non-white color that is preferably used in a standard ink printing process like 4C, 6C HEXACHROME, 8C Dark/Light, OPALTONE, etc. (i.e. a color preferably chosen from the 13 color palette of cyan (C), magenta (M), yellow (Y), black (K), light-cyan (c), light-magenta (m), light-yellow (y), light-black (k), red (R), green (G), blue (B), orange (O) and violet (V)). The use of this color palette enables display pixels with a limited subset of non-white colors to reproduce white/single-color images analogous to the color separated images from known printing processes that in aggregate sum to a color image for the viewer. Thus, multiple display elements can be combined into "pixels" composed of bicolor display elements of which each has about one half of its surface area colored white, and the remaining portion colored with one of the ink colors used in an ink printing process that the display is tailored to mimic. The overall electronic paper display is then formed from a plurality of these pixels.

Display Element Examples

In an exemplary embodiment, each bicolor display element has white as one of its two colors because in state of the art printing processes, multicolor images (such as those that might be displayed on a color computer screen) are generally separated into single-color/white images to enable printing on paper using the available inks in a printer. For example, in the 4C process cyan/white, magenta/white, yellow/white and black/white images extracted from a full color image are reproduced on white paper by cyan, magenta, yellow and black inks respectively. Analogously, each individual display element in an electronic paper pixel that is tailored to an existing ink printing process would be used to display a portion of a respective single-color/white image constructed from equally spaced and sized colored or white square dots on white paper.

Use of non-white colors selected from a palette of inks used in standardized printing processes enables the electronic paper to display images using ink colors that many viewers are already familiar with (e.g. from reading color magazines) without the need to overlay the display with brightness reducing colored filter overlays or energy consuming LCD overlays.

A monochrome electronic paper display should ideally be assembled from bicolor display elements that are all approximately half colored white and half colored black (or some other non-white color).

However, a color electronic paper display should ideally be assembled from bicolor display elements that are grouped into pixels. Each pixel would contain a fixed number of display elements that are each half colored white and half colored with one of the non-white colors essential to an existing ink printing process. Furthermore, to maintain non-distortion of images along a horizontal or vertical direction, each pixel should preferably cover a square area, even if this means making some of the individual display elements show a rectangular area to a viewer.

For example, an electronic paper display tailored to the widespread 4C printing process might contain pixels composed of 4 bicolor display elements as follows:

| C/W | M/W |
|-----|-----|
| Y/W | K/W |

An electronic paper display tailored to the 6 color OPALTONE printing process referred to in U.S. Pat. No. 8,064,112 might have a corresponding pixel composed of 6 bicolor display elements. In this case, each display element cup would each have a smaller horizontal dimension than vertical dimension so that the pixel covers a square area, as follows:

| C/W | Y/W | M/W |
|-----|-----|-----|
| B/W | G/W | R/W |

An electronic paper display tailored to the 6C HEXACHROME printing process might have a corresponding pixel composed of 6 bicolor display elements. In this case, display elements cups would each have a smaller horizontal dimension than vertical dimension so that the pixel covers a square area, as follows:

| C/W | Y/W | M/W |
|-----|-----|-----|
| K/W | O/W | G/W |

In alternative embodiments, fluorescent or metallic colors may be used (e.g. for road signs), or a common color other than white may be used on all bicolor display elements.

In other embodiments, a cuboid display element may be used as a tricolor display element with the use of 2 pairs of orthogonal electric-field-generating conducting plates per cup. Alternatively, 3 capacitor plates as shown in FIG. 15 may be used. Each of the display element's 4 faces capable of display to a viewer would have a unique color. For example, a 4 display element pixel whose display elements are colored C/c/W/W, M/m/W/W, Y/y/W/W and K/k/W/W, where the lower case characters are lighter versions of the uppercase character colors, could be used to enhance the tonality of a traditional 4C printing process.

In an alternative embodiment, a cuboid display element may be used as a 4-color display element with the use of 2 pairs of orthogonal electric-field-generating conducting plates per cup. Alternatively, 3 capacitor plates as shown in FIG. 15 may be used. Each of the display element's 4 faces capable of display to a viewer would have a unique color. 4 display elements per pixel are used, with display elements in a pixel colored as C/M/Y/W, M/Y/K/W, Y/K/C/W and K/C/M/W. In this manner, a uniform non-white color may be displayed on up to 3 out of 4 display elements in a pixel at any one time, while white can be displayed on all 4 elements of a pixel at any one time. This also brings the enhancement of a wide variety of mixed colors within a pixel, enabling good color depth while still preserving good quality monochrome displays.

Example with Perimeter Frame

In an exemplary embodiment, a perimeter frame (130) enables connection to an adjacent perimeter frame in order to enable modular assembly of a large billboard display.

For this embodiment, the box-structure (100) includes a row and column matrix of 64 cups horizontally and 36 cups vertically; the open-end (210) of each cup (105) has a square shape measuring $7/32$ of an inch by $7/32$ of an inch; the four sidewalls each have a thickness of $1/32$ of an inch; each cup (105) is $9/32$ of an inch deep; wherein each axle (120) has a diameter of $3/64$ of an inch; and four of the six faces: second face (510B); fourth face (510D); fifth face (510E); and sixth face (510F) of a display element (480) define a rectangle.

In an alternative embodiment, there is additionally a removable framed array (1010) of sixth electric-field-generating conducting plates (1020) matching the row (110) and column (115) matrix of the box-structure (100), wherein said removable framed array (1010) may be overlain on the viewable surface. Once overlain, the removable framed array (1010) imparts an electric field in each cup (105), in conjunction with each electric-field-generating conducting plate in the bottom of each cup, to change any image on the viewable surface.

Example of an Electronic Paper Billboard

This example illustrates details in the assembly of a 320-5/8"×180-5/8" monochrome electronic paper display intended for a roadside billboard. This display has a resolution of 1280×720 bicolor pixel display elements, with each display element having an area facing a head-on viewer of 3/16"×3/16".

This electronic paper display's area of 402.173 square feet is close to the display area of the standard 40'×10' roadside billboard size. The total surface area occupied by pixels out of this is about 225 square feet, or about 56% of the electronic paper display's area. These display dimensions approximate the 16:9 aspect-ratio (i.e. 1.778:1) common on many TVs. However, due to the presence of structural support elements the aspect-ratio is slightly reduced to approximately 1.775:1. The 1280×720 monochrome pixel resolution of the display is also a relatively common monitor resolution, and as such enables images of good quality to be displayed on the electronic paper.

The electronic paper display is assembled from 400 smaller display modules that each has resolution of 64×36 monochrome pixels. That is, each of these modules contains 2,304 monochrome pixel display elements, each of which has one-half of its surface area colored white and the remaining portion of its surface area colored black. Assembling the display in this modular form enables simpler transport of delicate display components and maintenance on portions of the display rather than the whole.

Each module is comprised of an ice-cube tray like structure consisting of a plurality of cell spaces separated by a grid of partition walls such that the opening to each cell space is a square measuring 7/32"×7/32", and the partition walls have a thickness of 1/32" including the thickness of any white coloring added onto them (such as paint or enamel). The ice cube cups are 9/32" deep. The tray is made of a conducting (and thus electrically shielding) rigid metal that is preferably colored white, but may be colored some other uniform color that the background "paper" is intended to be. Each module's dimensions are: 16 1/32"×9 1/32". The tray has extensions on back to enable its attachment to a rigid support structure. Ideally such attachments would extend out behind the tray in such a manner that they do not expand the module's dimensions in the plane of the tray itself, but rather behind it from the perspective of a viewer, since many trays are intended to be closely packed.

Next, 64 vertically-aligned, rigid-cylindrical wire like axles of 3/64" diameter, also colored white, are then passed through the frame with their central axes at 1/4" wide parallel vertical distances from each other. They are threaded through display elements already positioned within individual cell spaces. The central axes of these vertical rods are also recessed from the plane of the display module frame that faces the viewer by 1/8". To enable the display elements to be weaved onto these vertical rods of 3/64" diameter, each display element has a cylindrical tunnel going through it of 1/16" diameter through which the vertically running axle from the module is intended to fit. This tunnel's inner wall is formed by a 1/128" thick hard plastic or other coating fixed on the electret to enable rotation of the electret on its axis without damage to the surface of the electret itself. This plastic coating is also extended outward onto the lower square face of the electret (with respect to the ground) to protect its surface while also providing a measure of friction when it is not being rotated by an electric field.

The monochrome pixel display elements are each bicolor square parallelepiped beads with 2 square faces of dimensions 0.13258"×0.13258" and 4 rectangular faces of dimensions 0.13258"×0.1875", as the display element beads are intended to be able to rotate cleanly within dimensions of 7/32"×7/32"×7/32". In other words, the square faces of the display elements have dimensions 0.13258"×0.13258". Two adjacent rectangular faces of each bicolor display element are colored white and the remaining 2 adjacent rectangular faces are colored black. The two square faces with the axle holes for the tunnel in each display element are ideally half-colored white and half-colored black in a symmetrical fashion that aligns with the bicolor color scheme on the rectangular faces of each display element.

Each display element is an electret, with positively and negatively charged poles located along the diagonal plane that would split the display element into two triangular prism shapes. This configuration is intended to make a display element under the influence of an electric field react analogously to a compass needle in a magnetic field due to the torque induced in the display element by the electric field.

This display module is attached to a support structure, which is a separate grid shaped metal frame or metal backboard, by fastening its perimeter frame to the support structure at multiple points. Electronic connections to the electric-field-generating conducting plates in the bottom of each ice cube cup of the display module are made behind the display module with respect to a viewer. The overall electronic paper display is then formed by aligning multiple display modules in a planar grid of 20×20 display modules to form the surface of the electronic paper display. Individual module frames are fastened to each other at multiple points to increase structural integrity.

The apparatus that transmits torque to individual display elements consists of a conducting plate in the bottom of each "ice-cube cup" that is parallel to the virtual plane (310) of the electronic paper display and ideally of dimensions 3/16"×3/16"× 1/32", which when charged creates electric field lines in a general direction from the bottom of the ice-cube cup towards its opening.

A second array of parallel electric-field-generating conducting plates is optionally made and the combined electric-field-generating conducting plates charged only to rotate the display elements. This second array of parallel electric-field-generating conducting plates has square plates measuring e.g. 3/16"×3/16"×1/32" aligned in the center of each 7/32"×7/32" ice-cube cup entrance when the second array is brought directly in front of the display from the perspective of a viewer.

3-D Embodiments

To facilitate the display of three-dimensional (3D) images at a specific range of distances from the electronic paper display without the need for 3D glasses, a parallax barrier is overlain on the electronic paper display where slits in the parallax barrier lie along a direction going from the intended top to the intended bottom of the electronic paper display.

Alternately, the display may be overlain with a series of adjacent, transparent parallel strips having opposite polarizations to enable viewing of the display with polarized 3D glasses where the left and right eye lenses have opposite polarizations. In this case, alternating strips of the display surface display portions of images intended for a viewer's left or right eye, respectively.

Other Color Embodiments

Other embodiments of this invention utilize colored films overlain over the virtual plane (310) of the device display. For example a "colored filter array" similar to the ones used on E-INK CORPORATION devices may be used as follows: Once again, a pixel in the display would be created from 4 adjacent black/white bicolor display elements arranged in a square. One of the four display element cups would have a transparent red filter overlain on its opening. The second of the four display element cups would have a transparent green filter overlain on its opening. The third of the four display element cups would have a transparent blue filter overlain on its opening. The fourth of the four display element cups would either have no filter overlain on its opening, or alternately a transparent white or non-colored filter overlain on its opening. This may be accomplished by using a matrix of square filters arranged in such a manner over the surface of the display. It enables display of a versatile range of color images.

Color Film Example

An example of another embodiment utilizes colored films overlain over some or all of the surfaces of the display elements intended for display to a viewer. A pixel in the display is created from 4 adjacent black/white bicolor display elements arranged in a square. One of the four display elements has transparent red filters overlain on its white surfaces. The second of the four display elements has transparent green filters overlain on its white surfaces. The third of the four display elements has transparent blue filters overlain on its white surfaces. The fourth of the four display elements has either no filter overlain on its white surfaces, or alternately a transparent white or non-colored filter overlain on its white surfaces.

Alternately, four adjacent 4-color display elements of the type shown in FIG. 15 are used to form a pixel. The color tonality of reds, greens, blues and grays is enhanced by first coloring each display element white, light gray, dark gray and black on its four respective surfaces intended for display to a viewer. Then, the non-black surfaces of the first of the four display elements are either overlain with red filters, or a red filter is placed over the opening of the cup containing this display element. The non-black surfaces of the second of the four display elements is either overlain with green filters, or a green filter is placed over the opening of the cup containing this display element. The non-black surfaces of the third of the four display elements is either overlain with blue filters, or a blue filter is placed over the opening of the cup containing this display element. The non-black surfaces of the fourth of the four display elements either have no filter overlain on them, or alternately transparent white or non-colored filters are overlain on them or placed over the opening of the cup containing this display element.

Further variations in color tonality are achieved by increasing the number of monochrome or 4-color display elements in a pixel. For example 4×4 pixels are used in a display instead of 2×2 pixels. In this case, a 4×4 pixel is formed from four 2×2 clusters of display elements, with clusters each dedicated to showing reds, greens, blues or grayscale respectively.

In an alternative embodiment, a more sophisticated colored filter containing a richly multi-colored image may be overlain on a monochrome display. In this arrangement, the ability of each display element to either show reflective white or absorptive black enables portions of the image to appear animated by becoming brighter or darker due to rotation of the monochrome display elements. This technology is utilized with E-INK CORPORATION displays by the firm MOTION DISPLAY SCANDINAVIA AB. Alternately a sophisticated color filter of this type may be overlain over a display consisting of 4-color display elements each respectively capable of displaying white, light grey, dark grey or black to a viewer, enabling more subtle variations of the brightness of portions of the image to be achieved.

Four-Color Display Elements

An exemplary embodiment involves four-color display elements as shown in FIG. 15. This embodiment preferably includes 3 electric-field-generating conducting plates per cup (105): first electric-field-generating conducting plate (410A), second electric-field-generating conducting plate (410B), and bottom electric-field-generating conducting plate (910). It includes a display element (480) that is a rectangular cuboid. An electret (490) is within the display element (480). The display element (480) is able to rotate to show one of 4 possible flat faces to a viewer, where each face presents a different color: first color (1521); second color (1522); third color (1523); and fourth color (1524). Two electric-field-generating conducting plates in the same circuit are arranged parallel to each other on the vertical side walls of each cup. These are first electric-field-generating conducting plate (410A), second electric-field-generating conducting plate (410B), which are parallel electric-field-generating conducting plates. The bottom electric-field-generating conducting plate (910) has a separate circuit and it rests near the bottom of the cup (105). These 3 electric-field-generating conducting plates may all be contained in a cup insert similar to the one in FIG. 11. Note that optionally, a removable framed array (1010) may be overlain atop the front of the display to be used in unison with the bottom electric field generating conducting plates in the bottoms of the cups.

When the parallel electric-field-generating conducting plates are charged (with the electric field generating conducting plate in the bottom of the cup uncharged), the display element shows 1 of 2 possible rectangular faces to a viewer, depending on the direction of the electric field between them. When the bottom electric-field-generating conducting plate (910) of each cup is charged (with the parallel electric-field-generating conducting plates uncharged), the display element shows 1 of 2 other possible rectangular faces to a viewer, depending on the sign of the charge on the electric field generating conducting plate.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

Industrial Applicability

The invention has application to the signage industry.

What is claimed is:

1. An apparatus comprising an electromechanical image display, the electromechanical image display comprising:
    a box-structure defining a plurality of cups arranged in a row and column matrix;
    an axle for each column in the matrix;
    each cup in the plurality of cups:
        comprising an electrically conducting material;
        defining:
            an open-end facing outward, the open-end defined by an edge of the cup, said edge defining a virtual plane of a viewable surface;
            a bottom wall opposite the open-end, the bottom wall defining a hole therethrough; and
            four sidewalls;
    at least two electric-field-generating conducting plates in each cup in the plurality of cups;
    a display element for each cup, said display element comprising:
        an electret;
        said electret configured so that a positively charged polarity is facing a first junction of two faces of the six faces not defining the tunnel and a negatively charged polarity is facing a second junction of the remaining two faces of the six faces not defining the tunnel; and
        a parallelepiped having six faces and defining a tunnel through the geometric centers of two of the six faces, said tunnel comprising an axis of rotation for the display element;
    wherein the axle for each column is non-rotatably attached and passes through two of the four sidewalls of each cup in one column;
    wherein one display element is rotatably placed on the axle within the four sidewalls of each cup in its column; and
    wherein when the electric-field-generating conducting plates in any one cup have an electric charge, said electric charge causes the electret within that cup to rotate to a fixed position such that two faces of the parallelepiped are displayed facing outward at the open end.

2. The apparatus of claim 1, wherein there are two electric-field-generating conducting plates.

3. The apparatus of claim 2, further comprising a second cup for each cup in the plurality of cups; said second cup made of a non-conducting material; said second cup comprising 4 second-cup sidewalls and a second-cup bottom wall; said second cup conforming to and fitting within each cup in the plurality of cups; and said second cup holding the two electric-field-generating conducting plates embedded within two opposing side walls of the second cup.

4. The apparatus of claim 1, wherein there are three electric-field-generating conducting plates.

5. The apparatus of claim 4, further comprising a second cup for each cup in the plurality of cups; said second cup made of a non-conducting material; said second cup comprising 4 second-cup sidewalls and a second-cup bottom wall; said second cup conforming to and fitting within each cup in the plurality of cups, said second cup holding two of the three electric-field-generating conducting plates embedded within two opposing second-cup sidewalls; and said second cup holding one of the three electric-field-generating conducting plates embedded within the second-cup bottom wall.

6. The apparatus of claim 1, further comprising a perimeter frame that enables connection to an adjacent perimeter frame in order to enable modular assembly of a large billboard display; and wherein:
    the row and column matrix comprises 64 cups horizontally and 36 cups vertically;
    the open-end of each cup has a square shape measuring $7/32$ of an inch by $7/32$ of an inch;
    the four sidewalls each have a thickness of $1/32$ of an inch;
    each cup is $9/32$ of an inch deep; wherein each axle has a diameter of $3/64$ of an inch; and
    four of the six faces of each display element define a rectangle.

7. An apparatus comprising an electromechanical image display, the electromechanical image display comprising:
    a box-structure defining a plurality of cups arranged in a row and column matrix;
    an axle for each column in the matrix;
    each cup in the plurality of cups:
        comprising an electrically conducting material;
        defining:
            an open-end facing outward, the open-end defined by an edge of the cup, said edge defining a virtual plane of a viewable surface;
            a bottom wall opposite the open-end, the bottom wall defining a hole therethrough;
            a side wall; and
            an ear located on the side wall of each cup extending above the edge of each cup, said ear aligned on each cup to hold the axle above and parallel to the virtual plane;
    an electric-field-generating conducting plate located adjacent to the bottom wall in each cup in the plurality of cups;
    a display element for each cup, said display element comprising:
        an electret; and
        a parallelepiped having six faces;
        said display element defining a tunnel through the geometric centers of two of its six faces, said tunnel comprising an axis of rotation for the display element;
    wherein the axle for each column is fixed in position thereby making it non-rotatable;
    wherein the axle for each column passes through the ear of each cup in said column;
    wherein one display element is rotatably placed on each axle adjacent to the ear of each cup; and
    wherein when the electric-field-generating conducting plate in any one cup has an electric charge, said electric charge causes the display element within that cup to rotate to a fixed position such that two faces of the six faces are displayed facing outward at the open end.

8. The apparatus of claim 7, further comprising a removable framed array of electric-field-generating conducting plates matching the row and column matrix of the box-structure, wherein when said framed array is overlain on the viewable surface, said removable framed array imparts an electric field in each cup to change any image on the viewable surface.

\* \* \* \* \*